(No Model.)
E. THIELE.
FEATHERING PADDLE WHEEL.
No. 265,346. Patented Oct. 3, 1882.
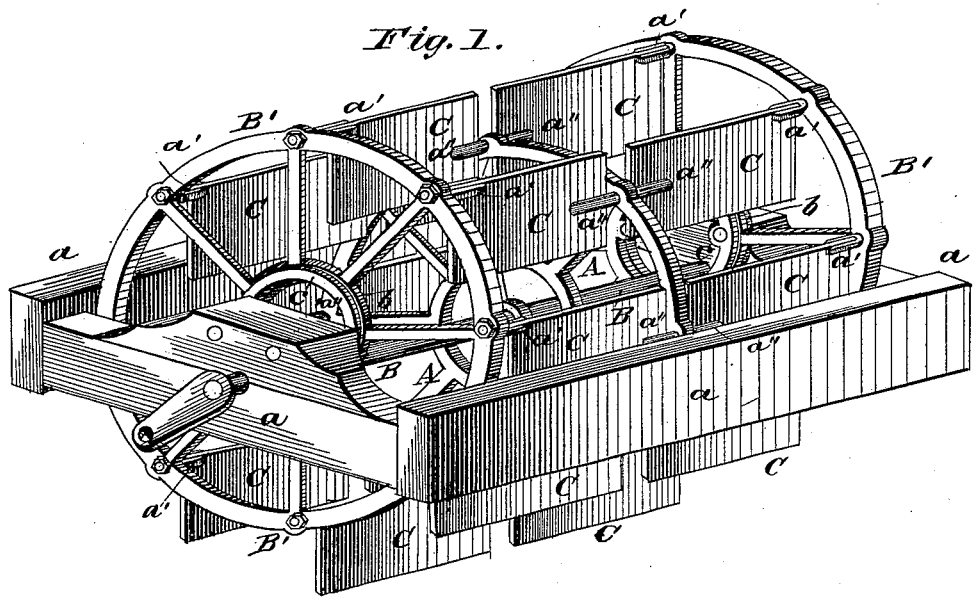
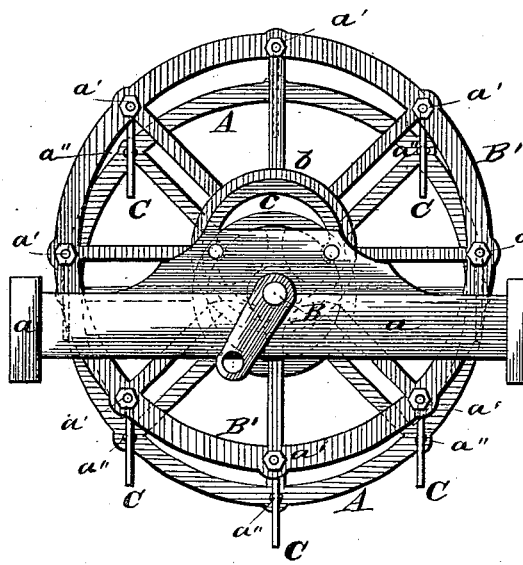
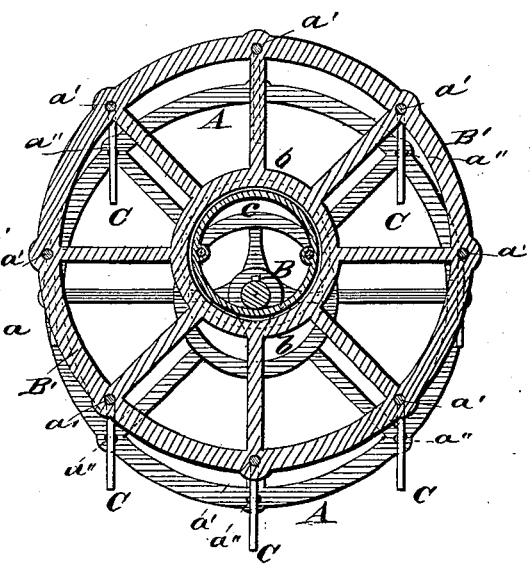
WITNESSES:
INVENTOR.
Edward Thiele,
by Louis Bagger & Co.
ATTORNEYS.

UNITED STATES PATENT OFFICE.

EDWARD THIELE, OF WELLSVILLE, MISSOURI, ASSIGNOR OF ONE-HALF TO HENRY E. LINENSCHMIDT, OF SAME PLACE.

FEATHERING PADDLE-WHEELS.

SPECIFICATION forming part of Letters Patent No. 265,346, dated October 3, 1882.

Application filed June 10, 1882. (No model.)

*To all whom it may concern:*

Be it known that I, EDWARD THIELE, of Wellsville, in the county of Montgomery and State of Missouri, have invented certain new and useful Improvements in Paddle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved paddle-wheel. Fig. 2 is an end view, and Fig. 3 is a transverse vertical section of the same.

This invention relates to paddle-wheels; and it consists in the improved construction of mechanism for "feathering" the same which will be hereinafter more fully described, and particularly pointed out in the claim.

$a$ in the drawings represents a suitable frame having bearings for the ends of the main shaft B of the paddle-wheel. Centrally upon said shaft is keyed or otherwise suitably secured a wheel, A.

$c$ $c$ are rings secured firmly upon the inner ends of the frame $a$, eccentrically to the shaft B, and forming bearings for suitably-constructed wheels B'.

C C are the paddles, which are provided at their upper outer corners with pivots $a'$, by which they are connected to the rims of the wheels B'. At their inner ends they have centrally-located pivots, $a''$, by which they are connected to the rim of the wheel A, as shown.

When the shaft B revolves the wheel A, which is keyed upon said shaft, carries with it the paddles C and the wheels B'. Owing to the eccentric arrangement of the latter, as described, the paddles are forced to retain constantly a vertical position, as shown in the several figures of the drawings.

I claim and desire to secure by Letters Patent of the United States—

The combination and arrangement, as described, of the frame $a$, the main shaft B, having fixed wheel A, the rings $c$, secured to the inner ends of the frame eccentrically to the main shaft, the wheels B', journaled upon said rings, and the paddles C, pivoted to the rings or wheels B' and B by pivots located at their outer upper corners and at the centers of their inner ends, respectively, as set forth.

In testimony that I claim the foregoing as my own I have hereunto affixed my signature in presence of two witnesses.

EDWARD THIELE.

Witnesses:
WILLIAM B. NICHOLS,
MICHEL BACHEL.